United States Patent
Li et al.

(10) Patent No.: US 11,111,255 B1
(45) Date of Patent: Sep. 7, 2021

(54) ZIRCONIUM-BASED METAL-ORGANIC FRAMEWORK MATERIAL UIO-66(ZR), RAPID ROOM-TEMPERATURE PREPARATION METHOD AND APPLICATION THEREOF

(71) Applicant: Tongji University, Shanghai (CN)

(72) Inventors: Fengting Li, Shanghai (CN); Yinan Wu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 16/934,066

(22) Filed: Jul. 21, 2020

(30) Foreign Application Priority Data

Mar. 6, 2020 (CN) .......................... 202010151476.0

(51) Int. Cl.
C07F 7/00 (2006.01)
(52) U.S. Cl.
CPC ..................... *C07F 7/003* (2013.01)
(58) Field of Classification Search
CPC ............. B01D 2253/204; B01J 20/226; B01J 31/1691; B01J 31/069; C07F 7/003
See application file for complete search history.

(56) References Cited

U.S. PATENT DOCUMENTS

| | | | | |
|---|---|---|---|---|
| 10,702,851 | B2* | 7/2020 | Ohashi | C07F 7/003 |
| 2020/0010486 | A1* | 1/2020 | Ohashi | C07F 3/02 |
| 2020/0206710 | A1* | 7/2020 | Yeung | F26B 5/06 |
| 2020/0406199 | A1* | 12/2020 | Wang | C02F 1/442 |

FOREIGN PATENT DOCUMENTS

| | | | |
|---|---|---|---|
| CN | 105037404 | A * | 11/2015 |
| CN | 106975456 | A * | 7/2017 |
| CN | 107163258 | A * | 9/2017 |
| CN | 107163258 | A | 9/2017 |
| CN | 107774331 | A * | 3/2018 |

OTHER PUBLICATIONS

CAS Abstract UiO 66, RN = 1072413-89-8 (2008) (Year: 2008).*
English-Language Machine Translation of CN-107163258-A (2017) (Year: 2017).*
English-Language Machine Translation of CN-107774331-A (2018) (Year: 2018).*
English-Language Machine Translation of CN-105037404-A (2015) (Year: 2015).*
M. Katz et al., 49 Chem. Commun, 9449-9451 (2013) (Year: 2013).*
M. DeStefano et al., 29 Chemistry of Materials, 1357-1361 (2017) (Year: 2017).*
K. Tulig et al., 4, RSC Advances, 51080-51083 (2014) (Year: 2014).*
H. Motegi et al., 24 J. Porous Mater, 1327-1333 (2017) (Year: 2017).*
F. Joly et al., 288 Microporous and Mesoporous Materials (2019) (Year: 2019).*
G. Shearer et al., 26 Chemistry of Materials (2014) (Year: 2014).*
Z. Moghaddam et al., 194 Acta Part A: Molecular and Biomolecular Spectroscopy, 76-82 (2018) (Year: 2018).*
Z. Hu et al., 54 Inorganic Chemistry, 4862-4868 (2015) (Year: 2015).*
G. Shearer et al., 28 Chemistry of Materials (2016) (Year: 2016).*
English Language Machine Translation of CN-106975456-A (2017) (Year: 2017).*
M. Kandiah et al., 20 Journal of Materials Chemistry, 9848-9851 (2010) (Year: 2010).*
A. Schaate et al., 17 Chem. Eur. J., 6643-6651 (2011) (Year: 2011).*
K. Lin et al., 461 Journal of Colloid and Interface Science, 79-87 (2016) (Year: 2016).*
Jasmina Hafizovic Cavka et al., A New Zirconium Inorganic Building Brick Forming Metal Organic Frameworks with Exceptional Stability, Journal of the American Chemical Society, 2008, pp. 13850-13851, 130(42).
Marco Taddei et al., Efficient microwave assisted synthesis of metal-organic framework UiO-66: optimization and scale up, Dalton Transactions, 2015, pp. 14019-14026, 44(31).
Chenghong Wang et al., Superior removal of arsenic from water with zirconium metalorganic framework UiO-66, Scientific Reports, 2015, pp. 1-10, vol. 5.

* cited by examiner

*Primary Examiner* — Alexander R Pagano
(74) *Attorney, Agent, or Firm* — Bayramoglu Law Offices LLC (57) ABSTRACT

A zirconium-based metal-organic framework material UiO-66(Zr) and a rapid room-temperature preparation method and application thereof are provided. The preparation method includes: (1) mixing a zirconium source and an organic ligand uniformly, then placing in methanol and stirring at room temperature, centrifuging and then discarding a supernatant to obtain a transparent gel-like intermediate product; and (2) heating and drying the intermediate product to obtain UiO-66(Zr). Compared with the prior art, the present invention excludes the use of N,N-dimethylformamide and other toxic organic solvents that are necessary in the traditional solvothermal method, and only needs to stir in methanol at room temperature and dry to obtain UiO-66 (Zr). The method has mild conditions and a high yield. Moreover, the product purity is extremely high, and the product activation step can be omitted. The product has good adsorption to fluoride ion in water, and can be applied to the adsorption treatment of fluorine-containing wastewater.

16 Claims, 5 Drawing Sheets

ZIRCONIUM-BASED METAL-ORGANIC FRAMEWORK MATERIAL UIO-66(ZR), RAPID ROOM-TEMPERATURE PREPARATION METHOD AND APPLICATION THEREOF

CROSS REFERENCE TO THE RELATED APPLICATIONS

This application is based upon and claims priority to Chinese Patent Application No. 202010151476.0, filed on Mar. 6, 2020, the entire contents of which are incorporated herein by reference.

TECHNICAL FIELD

The present invention belongs to the technical field of metal-organic framework materials, and in particular to a zirconium-based metal-organic framework material UiO-66 (Zr), and its rapid room-temperature preparation method and use in fluoride removal from water.

BACKGROUND

A metal-organic framework (MOF), also known as a metal-organic complex or an organic-inorganic hybrid material, is a type of porous material formed by self-assembly of a metal salt and an organic ligand. MOFs have attracted more and more attention recently because of the characteristics including a high porosity, a high specific surface area, an adjustable micropore size, a variable structure, and a diverse structural function. MOFs have been widely studied and applied in gas adsorption and storage, sensing and detection, drug delivery and catalysis reaction, and other fields.

UiO-66(Zr) is a metal-organic framework material formed by an inorganic metal unit $Zr_6O_4(OH)_4$ and twelve terephthalic acid ligands. UiO-66(Zr) has two cage structures, i.e., tetrahedron and octahedron. Eight faces on each octahedral cage are each connected to one tetrahedral cage, forming a three-dimensional structure in turn. Cavka et al. first reported the synthesis of UiO-66 in 2008. Due to the very strong interaction between Zr—O, the UiO-66(Zr) has good water stability and thermal stability. It is stable and maintains its structure in a solution of pH 1-11. The framework collapses only when the carbon-carbon bond formed by benzene ring and carboxylic acid breaks at 540° C.

Research on synthesis of UiO-66 is reported in the following patent and published documents.

Chinese patent CN107163258A discloses a preparation method of a metal-organic framework material UiO-66 in an ethanol phase. It is characterized in that an intermediate product is obtained by pretreating a zirconium source and an organic ligand, and then stirred in ethanol at room temperature to obtain UiO-66. This method requires a ball mill pretreatment, the process is relatively cumbersome and time-consuming.

A synthesis method of UiO-66(Zr) is reported in a published document of Journal of the American Chemical Society, 2008, 130(42): 13850-13851. $ZrCl_4$ and terephthalic acid are dissolved in an organic solvent of N,N-dimethylformamide, transferred to an airtight container, heated to 120° C. and maintained at 120° C. for 24 h, cooled to room temperature, then filtered, washed repeatedly with N,N-dimethylformamide, and dried to obtain UiO-66(Zr) powder. This method consumes a large amount of N,N-dimethylformamide and the reaction temperature is high.

An improved synthesis method of UiO-66(Zr) is reported in a published document of Scientific Reports, 2015, 5. $ZrCl_4$, terephthalic acid, water and N,N-dimethylformamide are mixed and dissolved in a ratio of 1:1:1:500, transferred to a stainless steel reactor, heated to 120° C. and marinated at 120° C. for 48 h, cooled to room temperature, then centrifuged to collect the solid. The solid is washed with ethanol multiple times, and vacuum dried at 120° C. to obtain UiO-66(Zr) powder. UiO-66(Zr) synthesized by this method has better crystallization, but the reaction time is longer.

A microwave-assisted method of synthesizing UiO-66 (Zr) is reported in a published document of Dalton Transactions, 2015, 44(31):14019-14026. $ZrCl_4$ and terephthalic acid are dissolved in N,N-dimethylformamide, and then acetic acid and water are added as auxiliary agents. The mixture is microwave heated to 120° C. for reaction for 15 min, cooled to room temperature, centrifuged to collect the solid. The solid is washed with N,N-dimethylformamide and acetone in order, and dried at 60° C. to obtain UiO-66(Zr) powder. This method takes less time, but needs to add acetic acid and water as auxiliary agents. Moreover, microwave-assisted heating is difficult to carry out scale-up experiments, and it is difficult to achieve industrial production.

The UiO-66(Zr) synthesis methods reported above each require heating or pretreating the reactants. The synthesis process is complicated, the conditions are harsh, and the reaction time is longer than 24 h. N,N-dimethylformamide and other toxic organic solvents are used. Moreover, the washing and activation processes are cumbersome and costly, making it difficult to scale up production.

SUMMARY

Objectives of the present invention is to provide a zirconium-based metal-organic framework material UiO-66(Zr) and its rapid room-temperature preparation method and application, so as to overcome the above-mentioned defects existing in the prior art. The metal-organic framework material UiO-66(Zr) is prepared in a green solvent system through fast, efficient and simple synthetic means to realize the industrial production and application of the new material.

The objectives of the present invention may be achieved by the following technical solutions.

A first aspect of the present invention provides a rapid room-temperature preparation method of a zirconium-based metal-organic framework material UiO-66(Zr), including the following steps:

(1) mixing a zirconium source and an organic ligand uniformly, then placing in methanol and stirring at room temperature, centrifuging and then discarding a supernatant to obtain a transparent gel-like intermediate product; and (2) heating and drying the intermediate product obtained in step (1) to obtain the zirconium-based metal-organic framework material UiO-66(Zr).

Preferably, the zirconium source is zirconium oxychloride octahydrate.

Preferably, the organic ligand is terephthalic acid, 2-bromoterephthalic acid or aminoterephthalic acid.

Preferably, a molar ratio of the zirconium source to the organic ligand is (1-2):(2-1).

Preferably, in step (1), a mass ratio of a mixture of the zirconium source and the organic ligand to the methanol is 1:(10-100).

Preferably, in step (1), the stirring time is 0.5-2 h.

In the present invention, during the stirring process in step (1), the solution gradually changes from transparent to white emulsion, the organic ligand completes the deprotonation process, and the zirconium atom in the zirconium oxychloride octahydrate and the oxygen atom in the organic ligand form a Zr—O bond. The two reactions are necessary to form UiO-66. After centrifugation, the transparent gel-like intermediate product is obtained.

Zirconium oxychloride octahydrate ($ZrOCl_2.8H_2O$) has a very high solubility in methanol and has a structure of $[Zr_4(OH)_8(H_2O)_{16}]^{8+}$, which is conducive to the rapid formation of Zr—O clusters ($[Zr_6O_4(OH)_4]^{12+}$) as one of the constituent units of UiO-66 at the beginning of the reaction. However, other metal sources such as zirconium chloride and zirconium sulfate have very low solubility in methanol, and therefore they cannot form similar structures in methanol and react with the organic ligand. Therefore, when other zirconium sources are used, the target product cannot be obtained under the same synthesis conditions.

According to experiments, the zirconium source used in the present invention must be zirconium oxychloride octahydrate, and it cannot be replaced with zirconium sulfate tetrahydrate, zirconium chloride and other zirconium sources. The solvent must be methanol, and cannot be replaced with water, ethanol, N,N-dimethylformamide and other solvents.

The excessive large mass/volume ratio (solid-liquid ratio) of the mixture of the zirconium source and the organic ligand to the methanol results in insufficient stirring and incomplete deprotonation of the organic ligands, which affects the formation of Zr—O bonds and reduces the yield and product cleanliness. The excessive small solid-liquid ratio results in increased solvent consumption and higher costs. Therefore, the suitable solid-liquid ratio is 1:(10-100). The stirring time is related to the solubility of the organic ligand in methanol. The organic ligand with relatively high solubility, such as aminoterephthalic acid, brominated terephthalic acid, etc., requires a shorter stirring time of 0.5-1 h. The organic ligand with relatively small solubility, such as terephthalic acid, requires a longer stirring time of 1-2 h. The stirring can be terminated once the solution becomes a milky white suspension. After centrifugation, the solid is clearly separated from the liquid, and the supernatant is completely transparent.

Preferably, in step (1), an ultrasonic treatment is first performed before the stirring. That is, after the zirconium source and the organic ligand are uniformly mixed and placed in methanol, the mixture is ultrasonically treated and subsequently stirred.

Preferably, in step (2), a temperature for the heating and drying is 40-120° C.

Preferably, in step (2), the time for the heating and drying is 0.5-4 h.

In the present invention, the function of heating in step (2) is to further crystallize the intermediate product to form a metal-organic framework compound. In this mild heating process, a primary structural unit $Zr_6O_4(OH)_4$ formed by the zirconium source and the organic ligand in the reaction solvent at room temperature is further coordinated with the organic ligand, the protons contained in the organic ligand can form hydrogen chloride molecules with chloride ions in the zirconium source, the hydrogen chloride molecules escape from the system, leading to continuous coordination and crystallization reactions, and ultimately forming the zirconium-based metal-organic framework material UiO-66 (Zr). In addition, the heating temperature in this process needs to be controlled to adjust the solvent volatilization rate. Excessive low heating temperature causes the solvent volatilization rate lower than the system crystallization rate, which may cause the increase in the lattice mismatch ratio and reduce the crystallinity of the product. Excessive high heating temperature makes the solvent volatilization rate exceeds the system crystallization rate, which may cause the incomplete crystallization process and reduce the crystallinity of the product. At the same time, high-temperature heating consumes a lot of energy, increasing the synthesis cost. Therefore, the optimum temperature is 40-120° C. The regulation of heating time is contrary to that of temperature, generally controlled within 0.5 h-4 h.

In the present invention, a white gel is obtained after heating in step (2). The gel at this time is the primary product formed by the metal and the ligand and contains a large amount of methanol solvent. Methanol is volatilized by heating and drying to obtain UiO-66(Zr) block.

UiO-66(Zr) synthesized by the method of the present invention has high purity, and needs no washing and activation steps, avoiding the use of more organic solvents, greatly simplifying the process, and reducing costs.

Compared with the prior art, the present invention adopts the synthesis strategy of the intermediate product to ultra-rapidly synthesize nano-sized UiO-66(Zr) under mild conditions, greatly shortening the synthesis time and simplifying the process. Moreover, the process is not necessary to perform at high temperature and needs no use of toxic organic solvents such as N,N-dimethylformamide. The product has high purity and needs no washing and activation steps, reducing the amount of solvent phase used in the preparation process. Further, the synthesis cost is reduced and the low-yield shortcoming of the traditional method is overcome. A metal-organic framework material UiO-66(Zr) with excellent quality is obtained, which makes it possible to synthesize metal-organic framework materials on a large scale.

A second aspect of the present invention provides a zirconium-based metal-organic framework material UiO-66 (Zr), which is obtained by using the preparation method.

A third aspect of the present invention provides an application of the zirconium-based metal-organic framework material UiO-66(Zr), and the zirconium-based metal-organic framework material UiO-66(Zr) is used for the adsorption of fluoride ion pollutants in water.

The application includes the following steps: adding a predetermined amount of the zirconium-based metal-organic framework material UiO-66(Zr) to a solution containing fluoride ions, ultrasonic treating, dispersing uniformly, stirring, and detecting the fluoride ion concentration at intervals. The results show that the zirconium-based metal-organic framework material UiO-66(Zr) of the present invention has more structural defects than UIO-66(Zr) synthesized by the conventional solvothermal method, and can expose more active sites such as Zr—OH to adsorb fluoride ions. At the same time, it also has hierarchical pore structures such as micro/mesopores, which is advantageous for the rapid diffusion and adsorption of adsorbate. Therefore, the zirconium-based metal-organic framework material UiO-66(Zr) obtained by the present invention has a significant adsorption effect on fluoride ions and a better adsorption capacity.

Furthermore, in a solution with an initial fluoride ion concentration of 19 mg/L, the saturated adsorption capacity of UiO-66(Zr) synthesized by the present invention is 49.15 mg/g, which is higher than that of UiO-66(Zr) synthesized by the conventional solvothermal method (the saturated adsorption capacity is 38.71 mg/g) by 27.0%. In a solution with an initial fluoride ion concentration of 38 mg/L, the saturated adsorption capacity of UiO-66(Zr) synthesized by the present invention is 63.06 mg/g, which is higher than that of UiO-66(Zr) synthesized by the conventional solvothermal method (the saturated adsorption capacity is 45.29 mg/g) by 39.2%. At the same time, the material's fluorine removal performance is also significantly better than conventional commercial purification materials such as activated alumina, showing a better application prospect in fluorine removal.

DETAILED DESCRIPTION OF THE EMBODIMENTS

The present invention will be described in detail below in conjunction with the drawings and specific embodiments.

Figure 1:
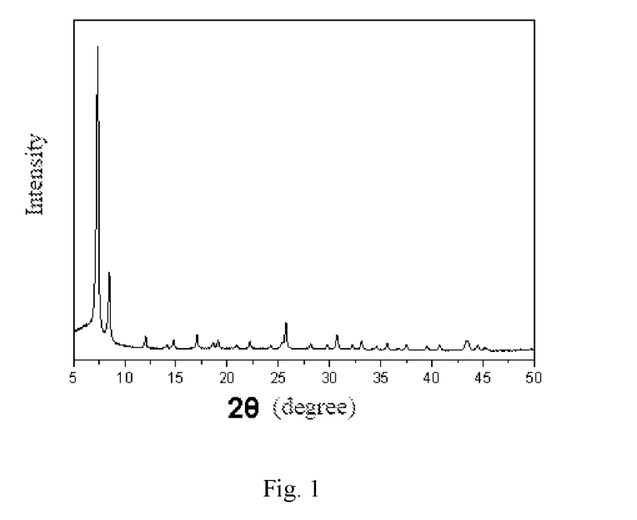
FIG. 1 is a theoretical simulation X-ray Diffraction (XRD) graph of UiO-66(Zr)

FIG. 1 is a theoretical simulation XRD graph of UiO-66(Zr).

Embodiment 1

Figure 2:
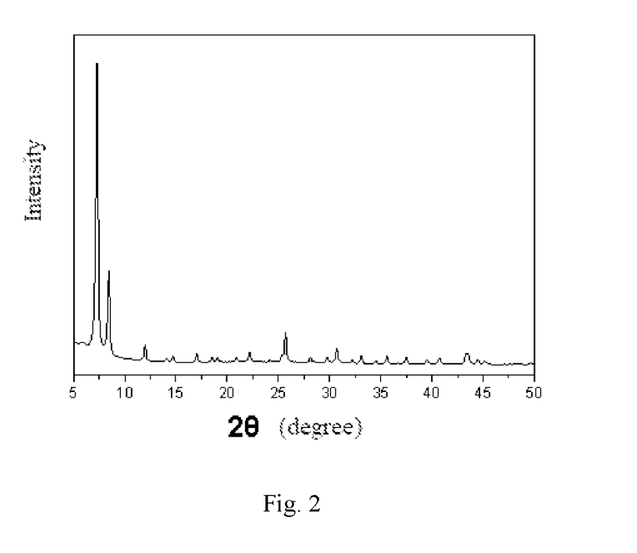
FIG. 2 is an XRD graph of the UiO-66(Zr) sample synthesized in Embodiment 1.

0.996 g of terephthalic acid and 1.932 g of zirconium oxychloride octahydrate are separately weighed and placed into a 150 ml beaker, 100 ml of methanol is added, and the mixture is stirred at a stirring speed of 350 rpm under a magnetic stirring for 1 h. After a reaction is completed, white emulsion obtained after the stirring is centrifuged and a supernatant is discarded to obtain a transparent gel-like intermediate product. The intermediate product is transferred to a blast oven, and heated and dried at 80° C. for 1 h to obtain 1.421 g of a final product with a yield of 85%. Analyzed by XRD characterization (FIG. 2), the product synthesized by this embodiment is a typical zirconium-based metal-organic framework material UiO-66(Zr).

Embodiment 2

Figure 3:
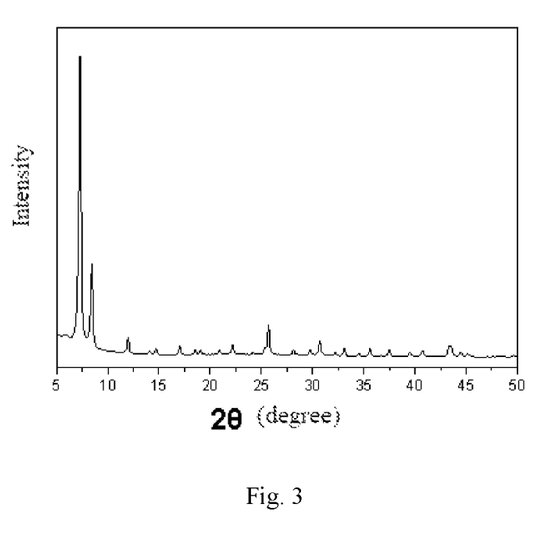
FIG. 3 is an XRD graph of the UiO-66(Zr) sample synthesized in Embodiment 2.

0.996 g of terephthalic acid and 1.932 g of zirconium oxychloride octahydrate are separately weighed and placed into a 150 ml beaker, 100 ml of methanol is added, and the mixture is stirred at a stirring speed of 350 rpm under a magnetic stirring for 1 h. After a reaction is completed, white emulsion obtained after the stirring is centrifuged and a supernatant is discarded to obtain a transparent gel-like intermediate product. The intermediate product is transferred to a blast oven, and heated and dried at 40° C. for 4 h to obtain 1.036 g of a final product with a yield of 62%. Analyzed by XRD characterization (FIG. 3), the product synthesized by this embodiment is a typical zirconium-based metal-organic framework material UiO-66(Zr).

Embodiment 3

Figure 4:
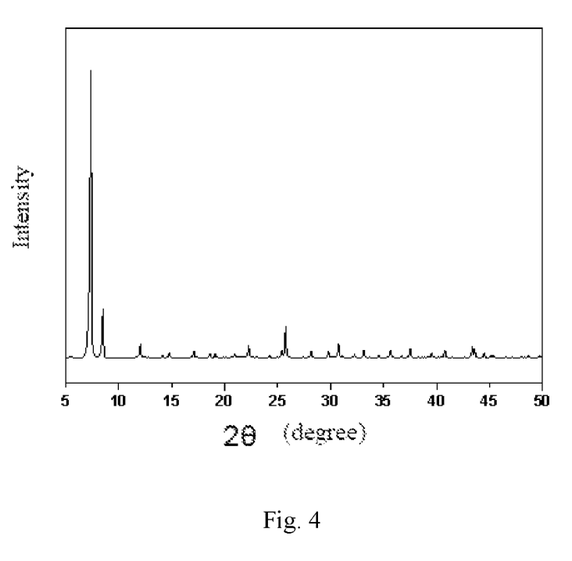
FIG. 4 is an XRD graph of the UiO-66(Zr) sample synthesized in Embodiment 3.

1.992 g of terephthalic acid and 1.932 g of zirconium oxychloride octahydrate are separately weighed and placed into a 150 ml beaker, 100 ml of methanol is added, and the mixture is stirred at a stirring speed of 350 rpm under a magnetic stirring for 1 h. After a reaction is completed, white emulsion obtained after stirring is centrifuged and a supernatant is discarded to obtain a transparent gel-like intermediate product. The intermediate product is transferred to a blast oven, and heated and dried at 80° C. for 4 h to obtain 1.487 g of a final product with a yield of 89%. Analyzed by XRD characterization (FIG. 4), the product synthesized by this embodiment is a typical zirconium-based metal-organic framework material UiO-66(Zr).

Comparative Example 1

Figure 5:
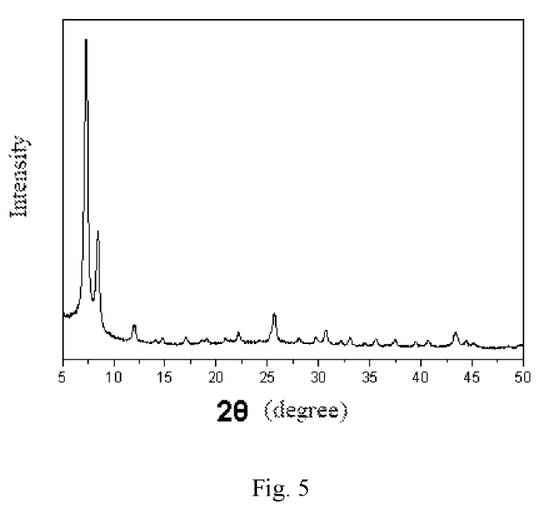
FIG. 5 is an XRD graph of the UiO-66(Zr) sample synthesized in Comparative Example 1.

0.996 g of terephthalic acid and 1.397 g of zirconium tetrachloride are separately weighed and placed into a 150 ml beaker, 100 ml of dimethylformamide (DMF) is added, and the solution is stirred at a stirring speed of 350 rpm under a magnetic stirring until uniform. The stirred solution is transferred to a self-pressurizing hydrothermal reactor and sealed, and the reactor is placed in a 120° C. blast oven and heated for 24 h. After a reaction is completed, the resulting solution is centrifuged and a supernatant is discarded to obtain a product, the product is washed three times with DMF and three times with methanol, and then the resulting product is transferred to a vacuum drying oven and vacuum dried at 120° C. for 4 h to obtain 1.367 g of UiO-66(Zr) product with a yield of 80%. Analyzed by XRD characterization (FIG. 5), the product synthesized by this comparative example is a typical zirconium-based metal-organic framework material UiO-66(Zr). This comparative example, however, uses the solvothermal method, namely, the synthesis is realized at high temperature and high pressure and takes a long time.

Comparative Example 2

Figure 6:
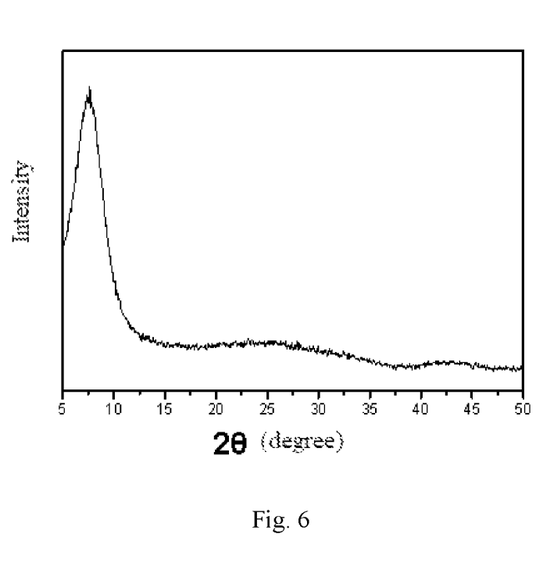
FIG. 6 is an XRD graph of the UiO-66(Zr) sample synthesized in Comparative Example 2.

0.996 g of terephthalic acid and 1.932 g of zirconium oxychloride octahydrate are separately weighed and placed into a 150 ml beaker, 100 ml of ethanol is added, and the mixture is stirred at a stirring speed of 350 rpm under a magnetic stirring for 1 h. After a reaction is completed, white emulsion obtained after the stirring is centrifuged and a supernatant is discarded to obtain a transparent gel-like intermediate product. The intermediate product is transferred to a blast oven, and heated and dried at 80° C. for 1 h to obtain 1.170 g of a final product with a yield of 70%. Analyzed by XRD characterization (FIG. 6), replacing methanol with ethanol fails to obtain a crystalline product, that is, a typical zirconium-based metal-organic framework material UiO-66(Zr) cannot be successfully synthesized.

Comparative Example 3

0.996 g of terephthalic acid and 2.131 g of zirconium sulfate tetrahydrate are separately weighed and placed into a 150 ml beaker, 100 ml of methanol is added, and the mixture is stirred at a stirring speed of 350 rpm under a magnetic stirring for 1 h. The reaction is ended and put aside, and a supernatant is discarded to obtain a white substance. The substance is transferred to a blast oven, and heated and dried at 80° C. for 4 h. The characterization shows the final product of the reaction is the raw material zirconium sulfate and the target product UiO-66(Zr) is not obtained because the zirconium sulfate is insoluble in methanol. Therefore, it is demonstrated that replacing the zirconium oxychloride octahydrate with zirconium sulfate tetrahydrate fails to obtain a typical zirconium-based metal-organic framework material UiO-66(Zr).

Embodiment 4

Figure 7:
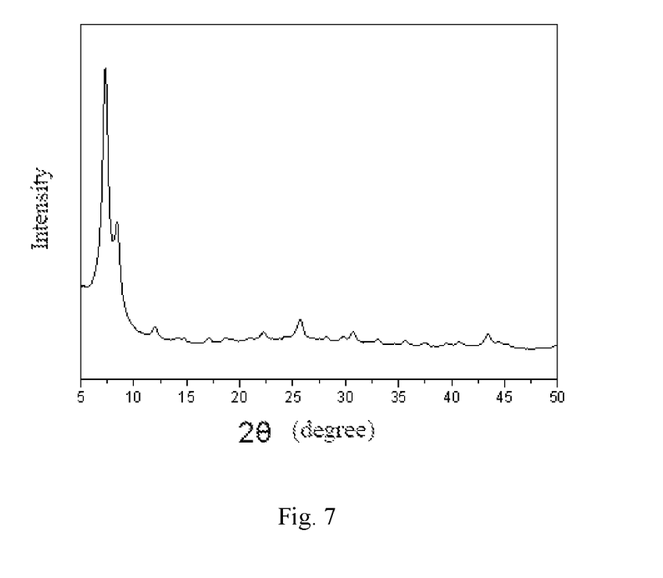
FIG. 7 is an XRD graph of the UiO-66(Zr) sample synthesized in Embodiment 4.
Figure 8:
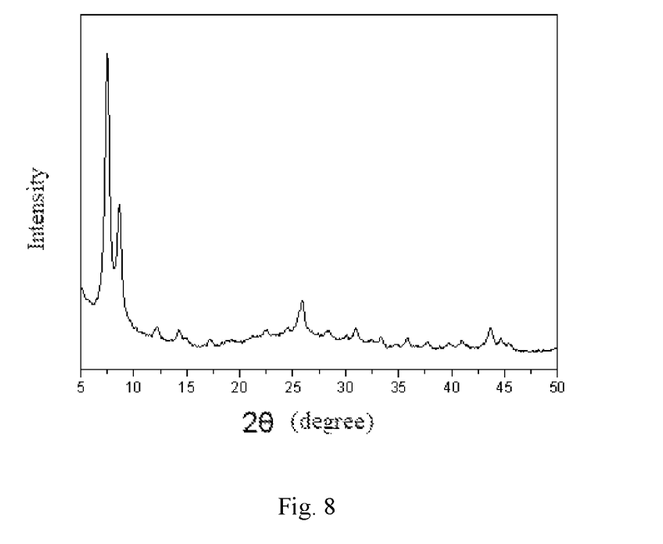
FIG. 8 is an XRD graph of the UiO-66(Zr) sample synthesized in Embodiment 5.

1.086 g of 2-aminoterephthalic acid and 1.932 g of zirconium oxychloride octahydrate are separately weighed and placed into a 150 ml beaker, 100 ml of methanol is added, and the mixture is stirred at a stirring speed of 350 rpm under a magnetic stirring for 1 h. After a reaction is completed, white emulsion obtained after the stirring is centrifuged and a supernatant is discarded to obtain a transparent gel-like intermediate product. The intermediate product is transferred to a blast oven, and heated and dried at 80° C. for 1 h to obtain 1.455 g of a final product with a yield of 83%. Analyzed by XRD characterization (FIG. 7), in this embodiment, a typical zirconium-based metal-organic framework material UiO-66(Zr) with amino groups can be successfully synthesized.

Embodiment 5

1.469 g of 2-bromoterephthalic acid and 1.932 g of zirconium oxychloride octahydrate are separately weighed and placed into a 150 ml beaker, 100 ml of methanol is added, and the mixture is stirred at a stirring speed of 350 rpm under a magnetic stirring for 1 h. After a reaction is completed, white emulsion obtained after the stirring is centrifuged and a supernatant is discarded to obtain a transparent gel-like intermediate product. The intermediate product is transferred to a blast oven, and heated and dried at 80° C. for 1 h to obtain 1.534 g of a final product with a yield of 72%. Analyzed by XRD characterization (FIG. 7), in this embodiment, a typical bromide-functionalized zirconium-based metal-organic framework material UiO-66(Zr) can be successfully synthesized.

Embodiment 6

Figure 9:
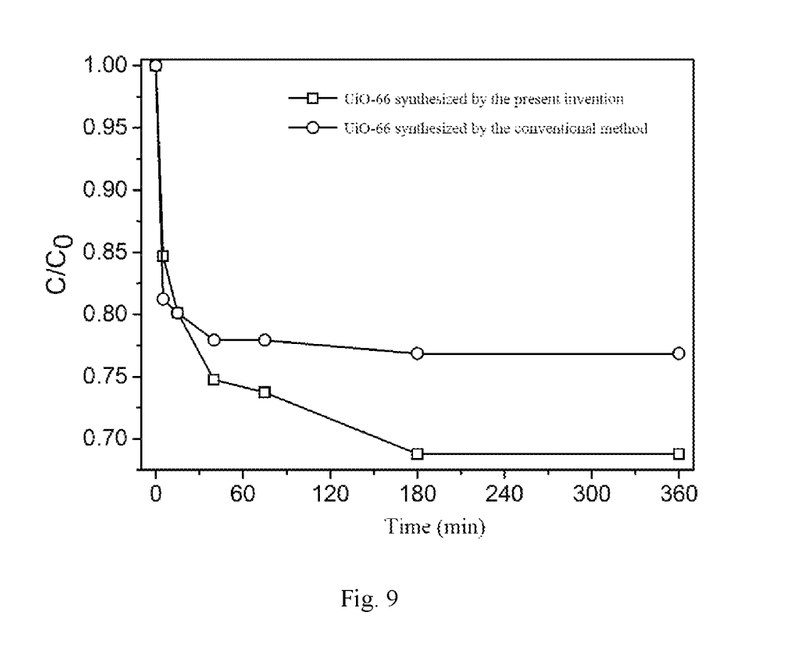
FIG. 9 is a schematic graph showing adsorption performance of UiO-66(Zr) synthesized in Embodiment 6 of the present invention and UiO-66(Zr) synthesized by a solvothermal method to fluoride ions.

100 mL of fluoride ion solution with an initial concentration of 19 mg/L is prepared, and the pH is adjusted to about 7.0 with HCl and NaOH. 10 mg of UiO-66(Zr) synthesized in Embodiment 1 is added, and an ultrasonic treatment is carried out for 10 s so that UiO-66(Zr) is uniformly dispersed in the solution. The experimental temperature is kept at 25° C., a reaction is carried out under a magnetic stirring and a stirring speed of 400 rpm, samples are taken at regular intervals, and a fluoride ion selective electrode is used to detect the fluoride ion concentration. A kinetic curve of UiO-66(Zr) absorbing fluoride ions is shown in FIG. 9. UiO-66(Zr) synthesized either by the present invention or the conventional solvothermal method can quickly reach the saturation of adsorption. Among them, the adsorption capacity of UiO-66(Zr) synthesized by the present invention is 49.15 mg/g, which is higher than that of UiO-66(Zr) synthesized by the conventional solvothermal method (the saturated adsorption capacity is 38.71 mg/g) by 27.0%.

Embodiment 7

Figure 10:
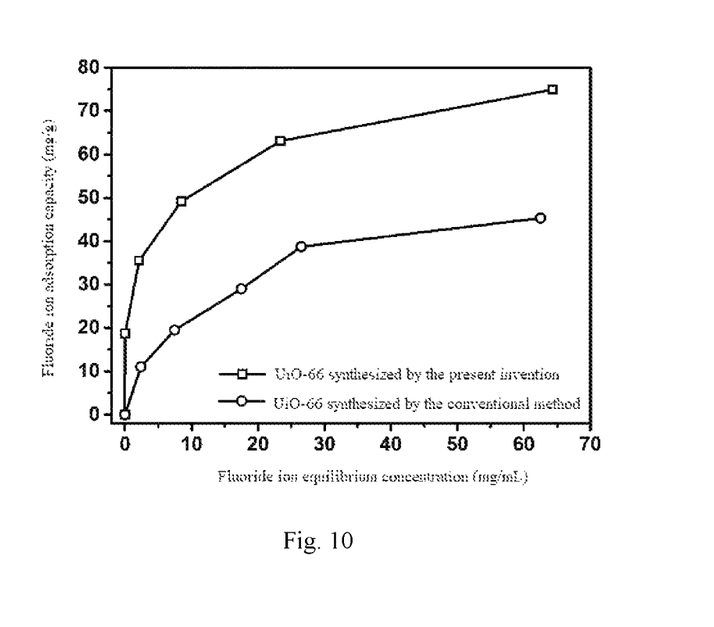
FIG. 10 is a schematic graph showing comparison of isothermal adsorptions of UiO-66(Zr) synthesized in Embodiment 7 of the present invention and UiO-66(Zr) synthesized by the solvothermal method to fluoride ions.

A series of 100 mL of fluoride ion solutions with an initial concentration range of 1.5-90 mg/L are prepared, and the pH is adjusted to about 7.0 with HCl and NaOH. 10 mg of UiO-66(Zr) synthesized in Embodiment 1 is sadded to each solution, and an ultrasonic treatment is carried out for 10 s so that UiO-66(Zr) is uniformly dispersed in the each solution. The experimental temperature is kept at 25° C., a reaction is carried out under a magnetic stirring and a stirring speed of 400 rpm for 24 h, and a fluoride ion selective electrode is used to detect the fluoride ion concentration after absorption for 24 h. Isothermal adsorption curves of UiO-66(Zr) absorbing fluoride ions are shown in FIG. 10. UiO-66(Zr) synthesized either by the present invention or the conventional solvothermal method exhibits excellent fluoride ion adsorption capacity, specifically, UiO-66(Zr) synthesized by the present invention shows better adsorption performance than UiO-66(Zr) synthesized by conventional solvothermal method in any fluoride ion equilibrium concentration range. Compared with the published documents, the UiO-66(Zr) synthesized by the present invention is significantly better than conventional commercial purification materials such as activated alumina in the fluorine removal performance.

Embodiment 8

This embodiment is basically the same as Embodiment 1, except that in this embodiment, the organic ligand is weighed to enable a molar ratio of the zirconium source to the organic ligand is 1:2.

Embodiment 9

This embodiment is basically the same as Embodiment 1, except that in this embodiment, the organic ligand is weighed to enable a molar ratio of the zirconium source to the organic ligand is 2:1.

Embodiment 10

This embodiment is basically the same as Embodiment 1, except that in this embodiment, the methanol is weighed to enable a mass ratio of a mixture of the zirconium source and the organic ligand to the methanol is 1:10.

Embodiment 11

This embodiment is basically the same as Embodiment 1, except that in this embodiment, the methanol is weighed to enable a mass ratio of a mixture of the zirconium source and the organic ligand to the methanol is 1:100.

Embodiment 12

This embodiment is basically the same as Embodiment 1, except that in this embodiment, the magnetic stirring time is 2 h.

Embodiment 13

This embodiment is basically the same as Embodiment 1, except that in this embodiment, the magnetic stirring time is 1.5 h.

Embodiment 14

This embodiment is basically the same as Embodiment 4, except that in this embodiment, the magnetic stirring time is 0.5 h.

Embodiment 15

This embodiment is basically the same as Embodiment 4, except that in this embodiment, the magnetic stirring time is 45 min.

Embodiment 16

This embodiment is basically the same as Embodiment 1, except that in this embodiment, the temperature for the heating and drying is 40° C., and the time for the heating and drying is 4 h.

Embodiment 17

This embodiment is basically the same as Embodiment 1, except that in this embodiment, the temperature for the heating and drying is 120° C., and the time for the heating and drying is 0.5 h.

The above description of the embodiments is to facilitate those of ordinary skill in the art to understand and use the invention. It is obvious that those skilled in the art can easily make various modifications to these embodiments, and apply the general principles described herein to other embodiments without creative efforts. Therefore, the present invention is not limited to the above embodiments, and the improvements and modifications made by those skilled in the art according to the disclosure of the present invention without departing from the scope of the present invention should fall within the protection scope of the present invention.

What is claimed is:

1. A rapid room-temperature preparation method of a zirconium-based metal-organic framework material UiO-66 (Zr), comprising the following steps:
   (1) mixing a zirconium source and an organic ligand uniformly to obtain a mixture, then placing the mixture in methanol to obtain a mixed solution and stirring the mixed solution at room temperature, centrifuging the mixed solution to obtain a centrifuged product and then discarding a supernatant of the centrifuged product to obtain a transparent gel-like intermediate product; and
   (2) heating and drying the transparent gel-like intermediate product obtained in step (1) to obtain the zirconium-based metal-organic framework material UiO-66(Zr);
   wherein the zirconium source is zirconium oxychloride octahydrate.

2. The rapid room-temperature preparation method of the zirconium-based metal-organic framework material UiO-66 (Zr) according to claim 1, wherein the organic ligand is one selected from the group consisting of terephthalic acid, 2-bromoterephthalic acid and aminoterephthalic acid.

3. The rapid room-temperature preparation method of the zirconium-based metal-organic framework material UiO-66 (Zr) according to claim 1, wherein a molar ratio of the zirconium source to the organic ligand is (1-2):(2-1).

4. The rapid room-temperature preparation method of the zirconium-based metal-organic framework material UiO-66 (Zr) according to claim 1, wherein in step (1), a mass ratio of a mixture of the zirconium source and the organic ligand to the methanol is 1:(10-100).

5. The rapid room-temperature preparation method of the zirconium-based metal-organic framework material UiO-66 (Zr) according to claim 1, wherein in step (1), a time for the stirring is 0.5-2 h.

6. The rapid room-temperature preparation method of the zirconium-based metal-organic framework material UiO-66 (Zr) according to claim 1, wherein in step (2), a temperature for the heating and drying is 40-120° C.

7. The rapid room-temperature preparation method of the zirconium-based metal-organic framework material UiO-66 (Zr) according to claim 1, wherein in step (2), a time for the heating and drying is 0.5-4 h.

8. A zirconium-based metal-organic framework material UiO-66(Zr), wherein the zirconium-based metal-organic framework material UiO-66(Zr) is obtained by using the rapid room-temperature preparation method according claim 1.

9. A method of using the zirconium-based metal-organic framework material UiO-66(Zr) according to claim 8, comprising applying the zirconium-based metal-organic framework material UiO-66(Zr) in water containing fluoride ion pollutants.

10. The rapid room-temperature preparation method of the zirconium-based metal-organic framework material UiO-66(Zr) according to claim 2, wherein a molar ratio of the zirconium source to the organic ligand is (1-2):(2-1).

11. The zirconium-based metal-organic framework material UiO-66(Zr) according to claim 8, wherein the organic ligand is one selected from the group consisting of terephthalic acid, 2-bromoterephthalic acid and aminoterephthalic acid.

12. The zirconium-based metal-organic framework material UiO-66(Zr) according to claim 8, wherein a molar ratio of the zirconium source to the organic ligand is (1-2):(2-1).

13. The zirconium-based metal-organic framework material UiO-66(Zr) according to claim 8, wherein in step (1), a mass ratio of a mixture of the zirconium source and the organic ligand to the methanol is 1:(10-100).

14. The zirconium-based metal-organic framework material UiO-66(Zr) according to claim 8, wherein in step (1), a time for the stirring is 0.5-2 h.

15. The zirconium-based metal-organic framework material UiO-66(Zr) according to claim 8, wherein in step (2), a temperature for the heating and drying is 40-120° C.

16. The zirconium-based metal-organic framework material UiO-66(Zr) according to claim 8, wherein in step (2), a time for the heating and drying is 0.5-4 h.

* * * * *